R. Broome,
Frying Pan & Steamer.
No. 64,278.  Patented Apr. 30. 1867.
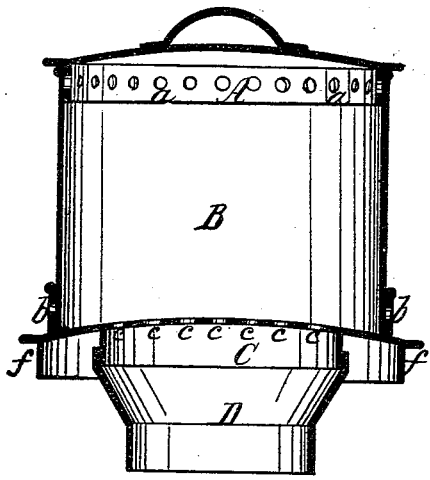
Fig. 1.
Fig. 2.
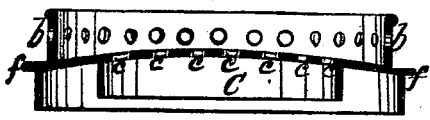
Fig. 3.
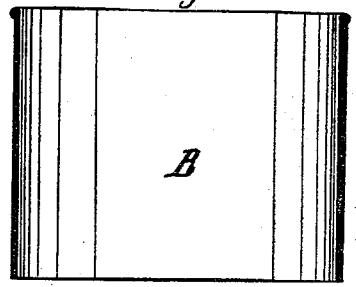
Fig. 4.
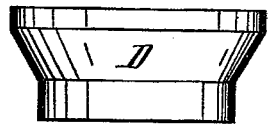
Fig. 5.
Witnesses:
Theo Tusch
Wm Truwn
Inventor:
Robert Broome
Per Munn & Co
Attorneys.

United States Patent Office.

ROBERT BROOME, OF CENTRAL FALLS, RHODE ISLAND.

Letters Patent No. 64,278, dated April 30, 1867.

COOKING VESSEL FOR FRYING, STEAMING, &c.

*The Schedule referred to in these Letters Patent and making part of the same.*

TO ALL WHOM IT MAY CONCERN:

Be it known that I, ROBERT BROOME, of Central Falls, in the county of Providence, and State of Rhode Island, have invented a new and improved Combined Steamer and Pan Cover; and I do hereby declare that the following is a full, clear, and exact description thereof, which will enable those skilled in the art to make and use the same, reference being had to the accompanying drawing, forming part of this specification.

The object of this invention is to prevent the flying and spattering of the fat or gravy in the process of frying meat, while, at the same time, the steam and gases are allowed to escape; and also to combine the cover with a steamer for cooking vegetables in such a manner that the same cover which allows the gases to escape from the frying-pan shall be a tight cover for the steamer; and the invention consists in making the combined article in four parts, as will be hereinafter described. In the accompanying drawings—

Figure 1 represents the four parts of which the steamer and cover is composed, put together or combined as it is when used as a steamer.

Figure 2 is the lower portion of the steamer without the cover.

Figure 3 is the cover.

Figure 4 is the body of the steamer.

Figure 5 is the bottom portion when used as a steamer in certain cases.

Similar letters of reference indicate corresponding parts.

A is the cover, with a deep flange, $a'$, under the rim, having a row of holes, $a$, through it all around; otherwise it is of the kind of covers commonly used. B is a section of a plain cylinder into which the cover fits; it forms the body of the steamer, the lower portion fitting into the part C. C is the portion that forms the bottom part of the steamer, as in fig. 1. There is a row of holes, $b$, around the upper portion of C, and when the body of the steamer B is attached these holes are closed, as seen in the drawing in fig. 1. The bottom of C is also made with holes through the surface, which is covered by D, as seen at $c$, figs. 1 and 2. When used as a steamer the holes in the cover A are closed, as the flange $a'$ with the holes shuts down into the body B of the steamer. When the article is to be used for frying or broiling purposes the body B of the steamer and the bottom D are taken off and the cover A is put on the part C. Here it may be either a tight cover, as when on the steamer, or an open cover to let the gases escape. This is done by turning the cover so that the holes through it and the holes through C will register or be opposite each other, or by turning the cover so that the holes will not register or be opposite each other, or so that a space will cover the hole. When thus prepared for frying or broiling, it is placed on a common iron spider or frying-pan, and the steam and gases will escape through the holes, which may be left entirely or partially open, and the fat will be prevented from flying by the tight cover above. The part D, fig. 5, which is attached when the article is used as a steamer, is only useful when it is convenient to place the steamer over a small hole, as the top of the tea-kettle, for instance. Ordinarily, the steamer is used without it on a common kettle or boiler in the usual way, resting on the flange $f$. When B and C are together, the steamer may be used as a strainer for various substances.

Having thus described my invention, what I claim as new, and desire to secure by Letters Patent, is—

The culinary vessel or utensil herein described, composed of parts A, B, C, and D, when constructed, combined, and arranged substantially as set forth.

ROBERT BROOME.

Witnesses:
ISAAC SHORE,
JOHN P. GREGORY.